(12) United States Patent
Hull et al.

(10) Patent No.: US 11,772,805 B2
(45) Date of Patent: Oct. 3, 2023

(54) CONFIGURABLE ELECTRICAL ARCHITECTURES FOR EVTOL AIRCRAFT

(71) Applicant: Textron Innovations Inc., Providence, RI (US)

(72) Inventors: Michael Raymond Hull, Fort Worth, TX (US); Steven Loveland, Keller, TX (US); Yue Fan, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 120 days.

(21) Appl. No.: 17/173,989

(22) Filed: Feb. 11, 2021

(65) Prior Publication Data

US 2022/0250755 A1  Aug. 11, 2022

(51) Int. Cl.
*B64C 29/00* (2006.01)
*B64D 27/02* (2006.01)
(Continued)

(52) U.S. Cl.
CPC ........... *B64D 27/24* (2013.01); *B60L 50/10* (2019.02); *B60L 50/60* (2019.02); *B60L 50/70* (2019.02);
(Continued)

(58) Field of Classification Search
CPC .... B64D 27/24; B64D 31/06; B64D 2221/00; B64D 27/02; B64D 2027/026;
(Continued)

(56) References Cited

U.S. PATENT DOCUMENTS

| 8,469,306 B2 | 6/2013 | Kuhn, Jr. |
| 2016/0244158 A1 | 8/2016 | Fredericks et al. |

(Continued)

FOREIGN PATENT DOCUMENTS

WO  2019211875 A1  11/2019

OTHER PUBLICATIONS

European Exam Report; Application No. 22150485.5; EPO; dated Jun. 9, 2022.
(Continued)

*Primary Examiner* — Elim Ortiz
(74) *Attorney, Agent, or Firm* — Lawrence Youst PLLC (57) ABSTRACT

A configurable electrical architecture for an eVTOL aircraft having a takeoff and landing power mode and a cruise power mode. The configurable electrical architecture includes a power-optimized power source including a high-power battery array and an energy-optimized power source selected from a plurality of interchangeable energy-optimized power sources including a high-energy battery array, a hydrogen fuel cell system and a turbo-generator system. A distribution system is electrically coupled to the power-optimized power source and the energy-optimized power source. At least one electric motor is electrically coupled to the distribution system. In the takeoff and landing power mode, both the power-optimized power source and the energy-optimized power source provide electrical power to the at least one electric motor. In the cruise power mode, the energy-optimized power source provides electrical power to the at least one electric motor and to the power-optimized power source to recharge the high-power battery array.

17 Claims, 8 Drawing Sheets

(51) Int. Cl.
*B64D 27/24* (2006.01)
*B60L 53/50* (2019.01)
*B60L 50/60* (2019.01)
*B60L 50/70* (2019.01)
*B60L 58/10* (2019.01)
*B60L 50/10* (2019.01)
*B64D 31/06* (2006.01)

(52) U.S. Cl.
CPC ............... *B60L 53/50* (2019.02); *B60L 58/10* (2019.02); *B64C 29/0016* (2013.01); *B64D 31/06* (2013.01); *B60L 2200/10* (2013.01); *B64D 2221/00* (2013.01)

(58) Field of Classification Search
CPC .......... B60L 50/10; B60L 50/60; B60L 50/70; B60L 53/50; B60L 58/10; B60L 2200/10; B60L 53/00; B64C 29/0016; B64C 29/0075; B64C 29/00; B64U 50/11; B64U 50/19; H02J 7/32; H02J 7/34
See application file for complete search history.

(56) References Cited

U.S. PATENT DOCUMENTS

| | | | |
|---|---|---|---|
| 2017/0072812 A1* | 3/2017 | Von Novak | H01M 10/4257 |
| 2018/0339781 A1 | 11/2018 | Lind et al. | |
| 2019/0100303 A1 | 4/2019 | Campbell | |
| 2019/0118943 A1* | 4/2019 | Machin | B64C 27/473 |
| 2019/0241274 A1 | 8/2019 | Hunkel | |
| 2019/0375495 A1 | 12/2019 | Pfammatter et al. | |
| 2020/0280108 A1* | 9/2020 | Tomar | H01M 50/574 |
| 2020/0290742 A1* | 9/2020 | Kumar | B64D 27/24 |
| 2020/0307390 A1* | 10/2020 | Clark | B60L 15/2045 |
| 2021/0094441 A1* | 4/2021 | Sampson | H01M 10/44 |
| 2021/0320353 A1* | 10/2021 | Miftakhov | H01M 16/006 |

OTHER PUBLICATIONS

European Search Report; Application No. 22150485.5; EPO; dated May 5, 2022.

* cited by examiner

CONFIGURABLE ELECTRICAL ARCHITECTURES FOR EVTOL AIRCRAFT

TECHNICAL FIELD OF THE DISCLOSURE

The present disclosure relates, in general, to electrical systems operable for use on aircraft configured for electric flight and, in particular, to electrical architectures operable for use on eVTOL aircraft that are selectably configurable based upon the service of the aircraft and/or the mission being performed by the aircraft.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that, in forward flight, produces low pressure on the upper surface and high pressure on the lower surface to generate the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and limitations of advancing blade Mach number.

Tiltrotor aircraft, which are another example of VTOL aircraft, attempt to overcome these drawbacks by utilizing proprotors that can change their plane of rotation based on the operation being performed. Tiltrotor aircraft typically have two or more proprotors mounted near the outboard ends of a fixed wing. The proprotors are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Electric VTOL (eVTOL) aircraft utilize electricity, either exclusively or in conjunction with liquid fuel, to power the various systems of the aircraft including the propulsion system. It has been found, however, that eVTOL aircraft require a disproportionate amount of electrical power during certain high power demand maneuvers including takeoff, hover and landing operations as compared to other phases of flight such as forward cruising. Attempts have been made to compensate for the disproportionate power consumption during transient high power demand maneuvers including using an oversized battery array. It has been found, however, that use of such an oversized battery array, increases the overall weight and cost of the aircraft while also reducing flight payload and/or aircraft range. Accordingly, a need has arisen for an improved power system for eVTOL aircraft that overcomes the disproportionate power consumption during transient high power demand maneuvers while not reducing the flight payload or aircraft range depending upon the desired service of the aircraft and/or the desired mission to be performed by the aircraft.

SUMMARY

In a first aspect, the present disclosure is directed to a configurable electrical architecture for an eVTOL aircraft having a takeoff and landing power mode and a cruise power mode. The configurable electrical architecture includes a power-optimized power source including a high-power battery array and an energy-optimized power source selected from a plurality of interchangeable energy-optimized power sources. A distribution system is electrically coupled to the power-optimized power source and the energy-optimized power source. At least one electric motor is electrically coupled to the distribution system. In the takeoff and landing power mode, both the power-optimized power source and the energy-optimized power source provide electrical power to the at least one electric motor. In the cruise power mode, the energy-optimized power source provides electrical power to the at least one electric motor and to the power-optimized power source to recharge the high-power battery array.

In certain embodiments, the power-optimized power source may include a battery management system and an electric power converter that are operably associated with the high-power battery array. In these embodiments, a distribution voltage of the distribution system and an operating voltage of the at least one electric motor may be higher than a battery voltage of the high-power battery array. In some embodiments, the energy-optimized power source may be a high-energy battery array. In such embodiments, the energy-optimized power source may include a battery management system and an electric power converter that are operably associated with the high-energy battery array. In these embodiments, the distribution voltage of the distribution system and the operating voltage of the at least one electric motor may be higher than a battery voltage of the high-energy battery array. In certain embodiments, the energy-optimized power may be a hydrogen fuel cell system. In such embodiments, the energy-optimized power source may include an electric power converter that is operably associated with the hydrogen fuel cell system. In these embodiments, the distribution voltage of the distribution system and the operating voltage of the at least one electric motor may be higher than the voltage of the electricity generated by the hydrogen fuel cell system. In some embodiments, the energy-optimized power source may be a turbo-generator system.

In certain embodiments, the plurality of interchangeable energy-optimized power sources may include a high-energy battery array, a hydrogen fuel cell system and a turbo-generator system. In some embodiments, the energy-optimized power source may include both a high-energy battery array and a hydrogen fuel cell system. In other embodiments, the energy-optimized power source may include both a high-energy battery array and a turbo-generator system. In still other embodiments, the energy-optimized power source may include both a hydrogen fuel cell system and a turbo-generator system. In some embodiments, the distribution system may include an electrical bus. In certain embodiments, the at least one electric motor may include a plurality of electric motors. In some embodiments, in the takeoff and landing power mode, a power ratio of the power-optimized power source to the energy-optimized power source may be at least 2 to 1.

In a second aspect, the present disclosure is directed to a configurable electrical architecture for an eVTOL aircraft having a takeoff and landing power mode and a cruise power mode. The configurable electrical architecture includes at least two independent electrical systems with each independent electrical system including a power-optimized power source including a high-power battery array, an energy-optimized power source selected from a plurality of interchangeable energy-optimized power sources, a distribution system electrically coupled to the power-optimized power source and the energy-optimized power source and at least one electric motor electrically coupled to the distribution system. In the takeoff and landing power mode, the power-optimized power sources and the energy-optimized power sources provide electrical power to the respective electric motors. In the cruise power mode, the energy-optimized power sources provide electrical power to the respective electric motors and to the respective power-optimized power sources to recharge the high-power battery arrays.

In a third aspect, the present disclosure is directed to an eVTOL aircraft having a takeoff and landing power mode and a cruise power mode. The eVTOL aircraft includes at least one rotor system having an electric motor and an electrical system configured to provide electric power to the electric motor. The electrical system has a configurable electrical architecture including a power-optimized power source including a high-power battery array, an energy-optimized power source selected from a plurality of interchangeable energy-optimized power sources and a distribution system electrically coupled to the power-optimized power source, the energy-optimized power source and electric motor. In the takeoff and landing power mode, both the power-optimized power source and the energy-optimized power source provide electrical power to the electric motor. In the cruise power mode, the energy-optimized power source provides electrical power to the electric motor and to the power-optimized power source to recharge the high-power battery array.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1A:
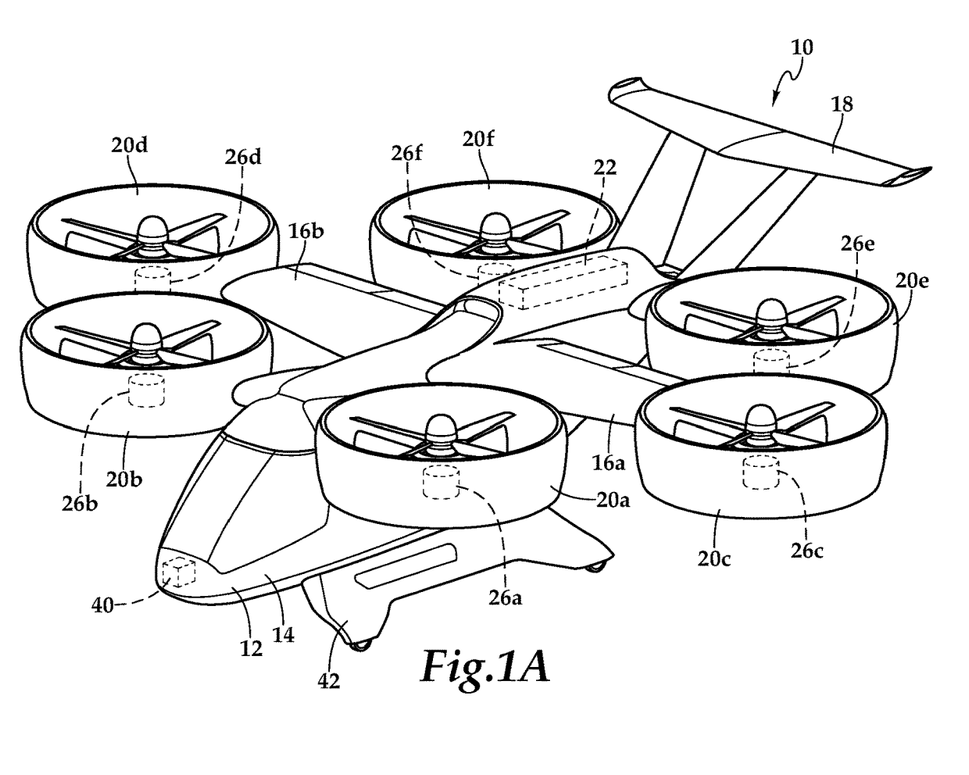
FIGS. 1A-1F are schematic illustrations of an eVTOL aircraft having a selectably configurable electrical architecture in accordance with embodiments of the present disclosure.
Figure 1B:
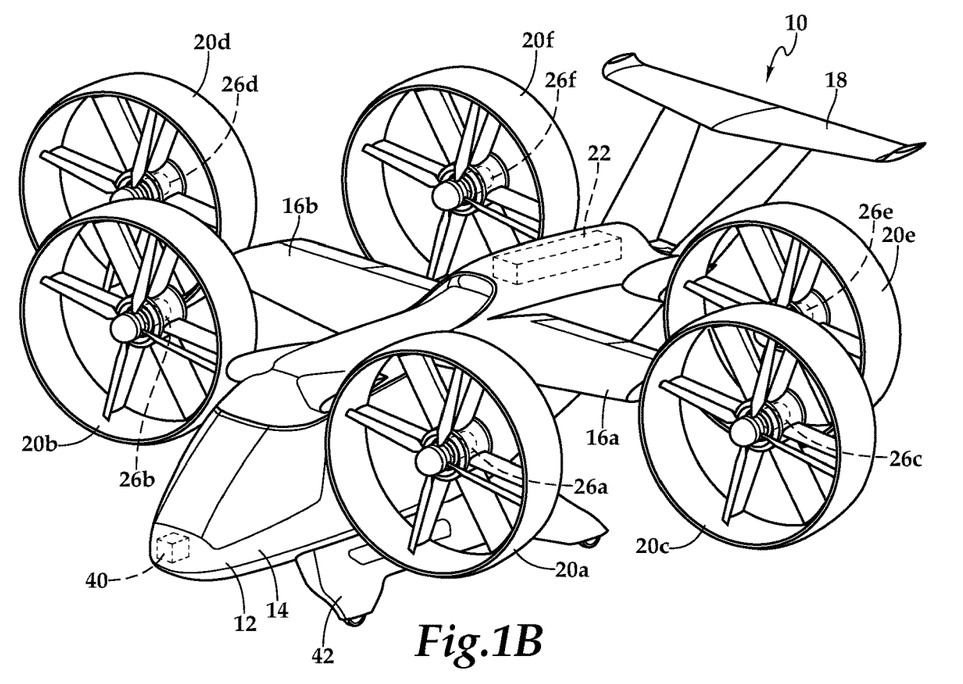
Figure 1C:
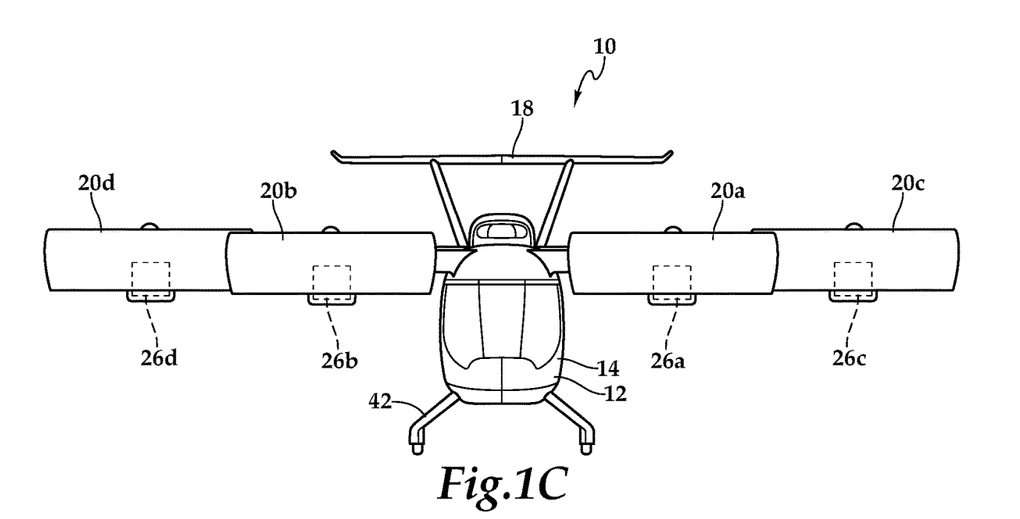
Figure 1D:
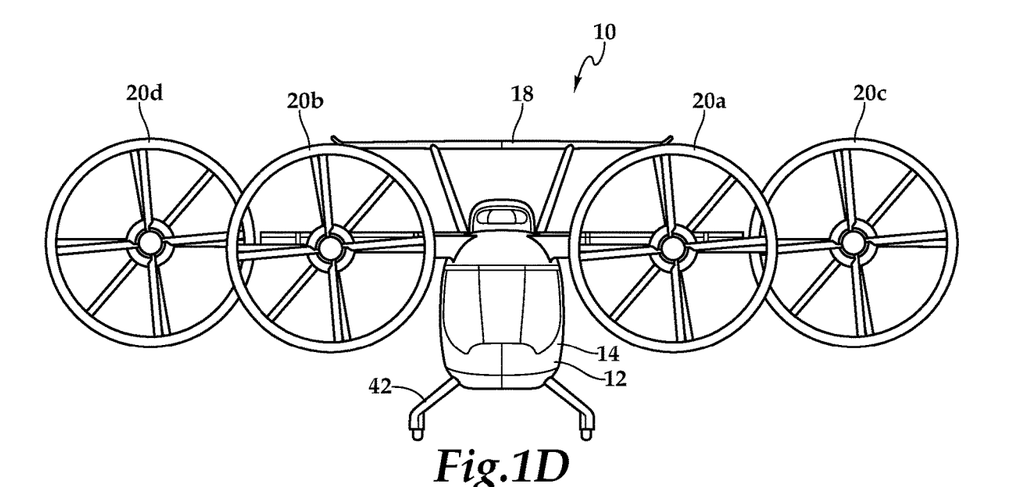
Figure 1E:
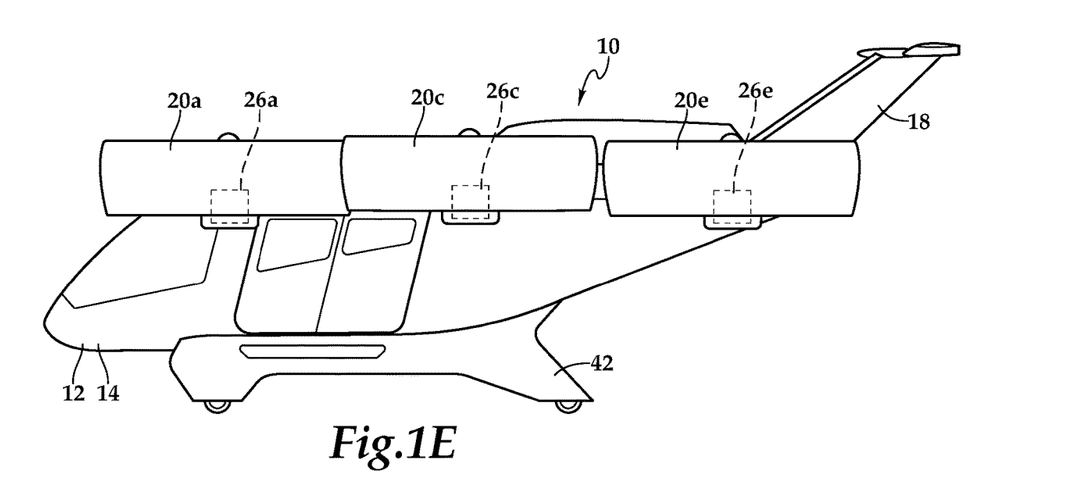
Figure 1F:
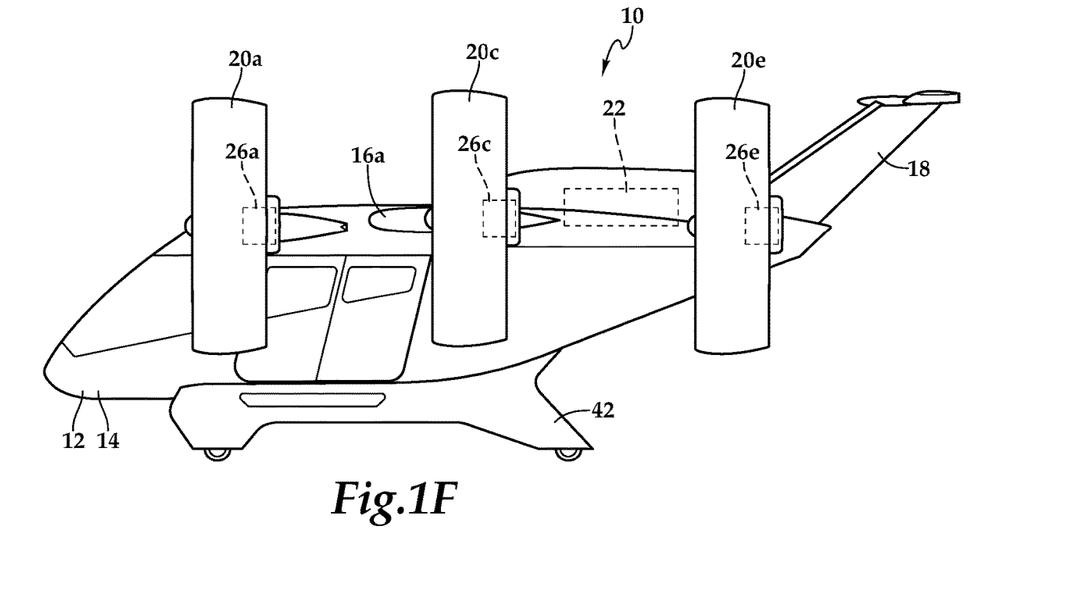

Referring to FIGS. 1A-1G in the drawings, a rotorcraft depicted as an electric vertical takeoff and landing (eVTOL) aircraft having a selectably configurable electrical architecture is schematically illustrated and generally designated 10. As illustrated, aircraft 10 is an air taxi that may be pilot operated, remotely operated or may operate autonomously to provide air taxi services. FIGS. 1A, 1C, 1E depict aircraft 10 in a VTOL orientation wherein the rotor systems provide thrust-borne lift. FIGS. 1B, 1D, 1F depict aircraft 10 in a forward flight orientation wherein the rotor systems provide forward thrust with the forward airspeed of aircraft 10 providing wing-borne lift enabling aircraft 10 to have a high speed and/or high endurance forward flight mode. In the illustrated embodiment, aircraft 10 has an airframe 12 including a fuselage 14, wings 16a, 16b and a tail assembly 18. Each of wings 16a, 16b has an airfoil cross-section that generates lift responsive to the forward airspeed of aircraft 10. In the illustrated embodiment, wings 16a, 16b are straight wings with a tapered leading edge. It will be appreciated, however, that wings 16a, 16b may be of a wide variety of shapes, sizes and configurations, depending upon the performance characteristics desired. In the illustrated embodiment, wings 16a, 16b include ailerons to aid in roll and/or pitch control of aircraft 10 during forward flight. Tail assembly 18 is depicted as having a pair of vertical stabilizers that may include one or more rudders to aid in yaw control of aircraft 10 during forward flight. In addition, tail assembly 18 has a horizontal stabilizer that may include one or more elevators to aid in pitch control of aircraft 10 during forward flight. It will be appreciated, however, that tail assembly 18 may be of a wide variety of shapes, sizes and configurations, depending upon the performance characteristics desired.

In the illustrated embodiment, aircraft 10 includes a thrust array depicted as six rotor systems. In other embodiments, an aircraft having a selectably configurable electrical architecture of the present disclosure could have other numbers of rotor systems both greater than or less than six. For example, a helicopter having a selectably configurable electrical architecture of the present disclosure could have a single rotor system, a tiltrotor aircraft having a selectably configurable electrical architecture of the present disclosure could have two proprotor systems, a quadcopter having a selectably configurable electrical architecture of the present disclosure could have four rotor systems and a multicopter having a selectably configurable electrical architecture of the present disclosure could have any number of rotor systems. In the illustrated embodiment, the thrust array of aircraft 10 includes a forward-port rotor system 20a, a forward-starboard rotor system 20b, a mid-port rotor system 20c, a mid-starboard rotor system 20d, an aft-port rotor system 20e and an aft-starboard rotor system 20f, which may be referred to collectively as rotor systems 20. Forward-port rotor system 20a and forward-starboard rotor system 20b are each rotatably mounted to a shoulder portion of fuselage 12 at a forward station thereof. Mid-port rotor system 20c is rotatably mounted on the outboard end of wing 16a. Mid-starboard rotor system 20d is rotatably mounted on the outboard end of wing 16b. Aft-port rotor system 20e and aft-starboard rotor system 20f are each rotatably mounted to a shoulder portion of fuselage 12 at an aft station thereof.

In the illustrated embodiment, rotor systems 20 are ducted rotor systems each having a four bladed rotor assembly with variable pitch rotor blades operable for collective pitch control. In other embodiments, the rotor systems could be non-ducted or open rotor systems, the number of rotor blades could be either greater than or less than four and/or the rotor blades could have a fixed pitch. Rotor system 20a includes at least one variable speed electric motor 26a, rotor system 20b includes at least one variable speed electric motor 26b, rotor system 20c includes at least one variable speed electric motor 26c, rotor system 20d includes at least one variable speed electric motor 26d, rotor system 20e includes at least one variable speed electric motor 26e and rotor system 20f includes at least one variable speed electric motor 26f. The electric motors 26a-26f associated with rotor systems 20 may be collectively referred to as electric motors 26. Each of electric motors 26 may have a speed controller or other modulating device operably associated therewith that is configured to provide variable speed control over a wide range of rotor speeds.

When aircraft 10 is operating in the VTOL orientation and supported by thrust-borne lift, rotor systems 20 each have a generally horizontal orientation such that the rotor assemblies are rotating in generally in the same horizontal plane, as best seen in FIGS. 1C, 1E. When aircraft 10 is operating in the forward flight orientation and supported by wing-borne lift, rotor systems 20 each have a generally vertical orientation with the forward rotor assemblies rotating generally in a forward-vertical plane, the mid rotor assemblies rotating generally in a mid-vertical plane and the aft rotor assemblies rotating generally in an aft-vertical plane, as best seen in FIG. 1F. Transitions between the VTOL orientation and the forward flight orientation of aircraft 10 are achieved by changing the angular positions of rotor systems 20 between their generally horizontal orientations and the generally vertical orientations as discussed herein.

Aircraft 10 includes an electrical system 22 that may include elements for the generation, storage, regulation and distribution of electric power. For example, in embodiments disclosed herein, electrical system 22 includes a power-optimized power source and a selectively configurable energy-optimized power source. The power-optimized power source includes one or more battery arrays or battery systems that include batteries with a high power rating that are configured to supply a high instantaneous power output for use during high power demand maneuvers such as takeoff, hover, landing, certain mid-flight operations, emergency operations and the like, which may be referred to as the takeoff and landing power mode of aircraft 10. These high-power batteries are also configured for rapid charging following a discharge event. The energy-optimized power source may include one or more battery arrays or battery systems that include batteries with a high energy rating or high capacity that are configured to store a significant amount of energy and supply power over an extended period of time but at a lower power level such as during the cruise phase or forward flight portion of a mission which may be referred to as the cruise power mode of aircraft 10. In this configuration, the high-energy batteries having the higher energy-to-power ratio are also used to charge the high-power batteries having the lower energy-to-power ratio during cruise power mode operations such that the high-power batteries are recharged for subsequent takeoff and landing power mode operations. The high-energy batteries can be used in combination with the high-power batteries in the takeoff and landing power mode.

Alternatively or additionally, the energy-optimized power source may include one or more turbo-generators, such as a turboshaft engine coupled to an electric generator. In this case, the turboshaft engine convert chemical energy stored in a liquid hydrocarbon fuel to mechanical energy via combustion that drives the electric generator which in turn converts the mechanical energy to electrical energy. The turbo-generators are used in combination with the high-power batteries such that the turbo-generators supply propulsive electric power to the electric motors plus electric power to recharge the high-power batteries in the cruise mode. In addition, the turbo-generators may provide a portion of the power in the takeoff and landing power mode with the high-power batteries providing the remainder of the power in the takeoff and landing power mode.

In another alternative, the energy-optimized power source may include one or more hydrogen fuel cells such as proton-exchange membrane fuel cells or polymer electrolyte membrane fuel cells. In this case, the hydrogen fuel cells convert chemical energy stored in a compressed hydrogen fuel to electrical energy by releasing electrons from the hydrogen at an anode and recombining the hydrogen ions with the free electrons and oxygen at a cathode that is separated from the anode by a separator plate such as a membrane. The hydrogen fuel cells are used in combination with the high-power batteries such that the hydrogen fuel cells supply propulsive electric power to the electric motors plus electric power to recharge the high-power batteries in the cruise mode. In addition, the hydrogen fuel cells may provide a portion of the power in the takeoff and landing power mode with the high-power batteries providing the remainder of the power in the takeoff and landing power mode.

In this manner, the electrical architecture of electrical system 22 of aircraft 10 is selectively configurable such that the power-optimized power source of the high-power batteries is paired with at least one of the energy-optimized power sources selected from the high-energy batteries, the turbo-generators and the hydrogen fuel cells, depending upon the intended service of aircraft 10 and/or the intended mission of aircraft 10. In some implementations, the power-optimized power source of the high-power batteries may be paired with at least two of the energy-optimized power sources. For example, the electrical architecture of electrical system 22 may include high-power batteries paired with high-energy batteries and hydrogen fuel cells, high-power batteries paired with high-energy batteries and turbo-generators or high-power batteries paired with hydrogen fuel cells and turbo-generators. It is also possible for the power-optimized power source of the high-power batteries to be paired with high-energy batteries, turbo-generators and hydrogen fuel cells in a single implementation.

Aircraft 10 has a fly-by-wire control system that includes a flight control system 40 that is preferably a redundant digital flight control system including multiple independent flight control computers. Flight control system 40 preferably includes non-transitory computer readable storage media including a set of computer instructions executable by one or more processors for controlling the operation of aircraft 10. Flight control system 40 may be implemented on one or more general-purpose computers, special purpose computers or other machines with memory and processing capability. Flight control system 40 may include one or more memory storage modules including random access memory, non-volatile memory, removable memory or other suitable memory entity. Flight control system 40 may be a microprocessor-based system operable to execute program code in the form of machine-executable instructions. Flight control system 40 may be connected to other computer systems via a suitable communication network that may include both wired and wireless connections.

Flight control system 40 communicates via a wired communications network within airframe 12 with electrical system 22 and the electronics nodes of each rotor system 20. Flight control system 40 receives sensor data from and sends flight command information to rotor systems 20 such that each rotor system 20 may be individually and independently controlled and operated. For example, flight control system 40 is operable to individually and independently control the rotor speed and the collective pitch of each rotor system 20 as well as the angular position of each rotor system 20. Flight control system 40 may autonomously control some or all aspects of flight operation for aircraft 10. Flight control system 40 is also operable to communicate with remote systems, such as a ground station via a wireless communications protocol. The remote system may be operable to receive flight data from and provide commands to flight control system 40 to enable remote flight control over some or all aspects of flight operation for aircraft 10. In addition, aircraft 10 may be pilot operated such that a pilot interacts with a pilot interface that receives flight data from and provide commands to flight control system 40 to enable onboard pilot control over some or all aspects of flight operation for aircraft 10.

Aircraft 10 includes a landing gear 42 for ground operations. Landing gear 42 may include passively operated pneumatic landing struts or actively operated landing struts. In the illustrated embodiment, landing gear 42 includes a plurality of wheels that enable aircraft 10 to perform ground maneuvers. Landing gear 42 may include a passive brake system, an active brake system such as an electromechanical braking system and/or a manual brake system to facilitate parking as required during ground operations and/or passenger ingress and egress.

Figure 2A:
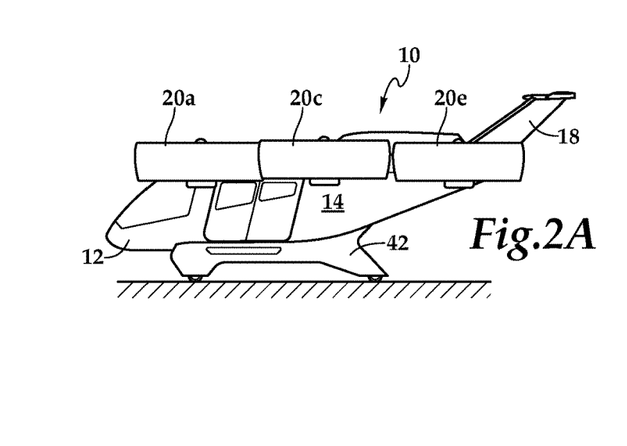
FIGS. 2A-2H are schematic illustrations of an eVTOL aircraft having a selectably configurable electrical architecture in a sequential flight operating scenario in accordance with embodiments of the present disclosure.

Referring additionally to FIGS. 2A-2H in the drawings, a sequential flight-operating scenario of aircraft 10 is depicted. As best seen in FIG. 2A, aircraft 10 is positioned on a surface prior to takeoff. When aircraft 10 is ready for a mission, flight control system 40 commences operations to provide flight control to aircraft 10 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne lift and thrust-borne lift.

Figures 2B, 2C, 2D:
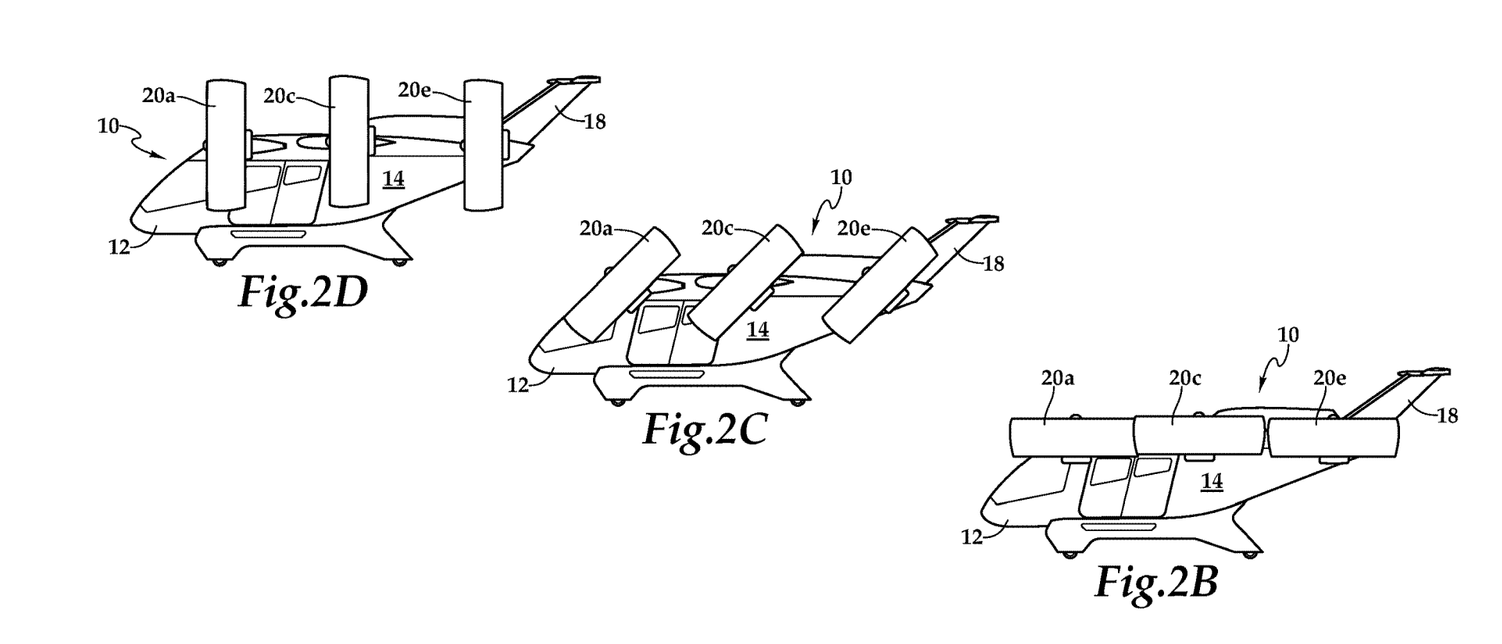
Figure 2E:
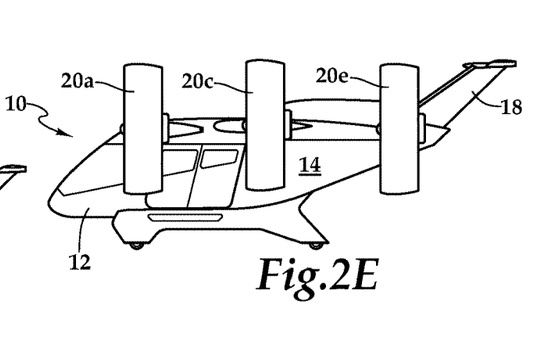

As best seen in FIG. 2B, aircraft 10 has performed a vertical takeoff and is engaged in thrust-borne lift. As illustrated, the rotor assemblies of each rotor system 20 are rotating in the same horizontal plane forming a two-dimensional distributed thrust array of six rotor systems. As the longitudinal axis and the lateral axis of aircraft 10 are both in the horizontal plane, aircraft 10 has a level flight attitude. During hover, flight control system 40 may utilize the individual variable speed control capability of rotor systems 20 to control flight dynamics to maintain hover stability and to provide pitch, roll and yaw authority for aircraft 10. As takeoff and hover are high power demand maneuvers, electrical system 22 preferably utilizes a combination of the power-optimized power source of the high-power batteries together with the energy-optimized power source of the high-energy batteries, the turbo-generators and/or the hydrogen fuel cells depending upon the configuration of electrical system 22 to provide the required propulsive power for rotor systems 20.

After vertical assent to the desired elevation, aircraft 10 may begin the transition from thrust-borne lift to wing-borne lift. As best seen from the progression of FIGS. 2B-2D, the angular positions of rotor systems 20 are changed by a pitch down rotation to transition aircraft 10 from the VTOL orientation toward the forward flight orientation. As seen in FIG. 2C, rotor systems 20 have been collectively inclined about forty-five degrees pitch down. In the conversion orientations of aircraft 10, a portion of the thrust generated by rotor systems 20 provides lift while a portion of the thrust generated by rotor systems 20 urges aircraft 10 to accelerate in the forward direction such that the forward airspeed of aircraft 10 increases allowing wings 16a, 16b to offload a portion and eventually all of the lift requirement from rotor systems 20. As best seen in FIG. 2D, rotor systems 20 have been collectively inclined about ninety degrees pitch down such that the rotor assemblies are rotating in vertical planes providing forward thrust for aircraft 10 with wings 16a, 16b providing lift. Even though the conversion from the VTOL orientation to the forward flight orientation of aircraft 10 has been described as progressing with collective pitch down rotation of rotor systems 20, in other implementation, all rotor systems 20 need not be operated at the same time or at the same rate.

As forward flight with wing-borne lift requires significantly less thrust than VTOL flight with thrust-borne lift, the operating speed of some or all of rotor systems 20 may be reduced particularly in embodiments having collective pitch control. In certain embodiments, some of rotor systems 20 of aircraft 10 could be shut down during forward flight. As cruise in forward flight is a lower power demand operation, electrical system 22 utilizes the energy-optimized power source of the high-energy batteries, the turbo-generators and/or the hydrogen fuel cells depending upon the configuration of electrical system 22 to provide the required propulsive power for rotor systems 20 and to charge the high-power batteries of the power-optimized power source such that the high-power batteries are suitably recharged for subsequent maneuvers in the takeoff and landing power mode including emergency maneuvers.

Figure 2F:
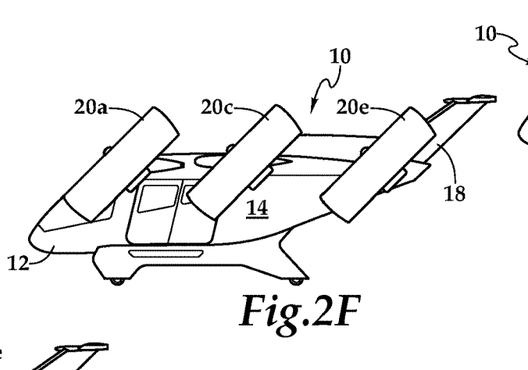
Figure 2G:
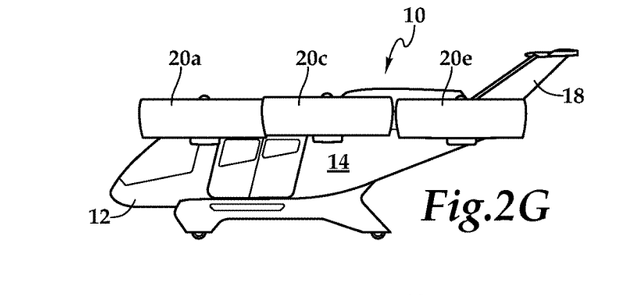
Figure 2H:
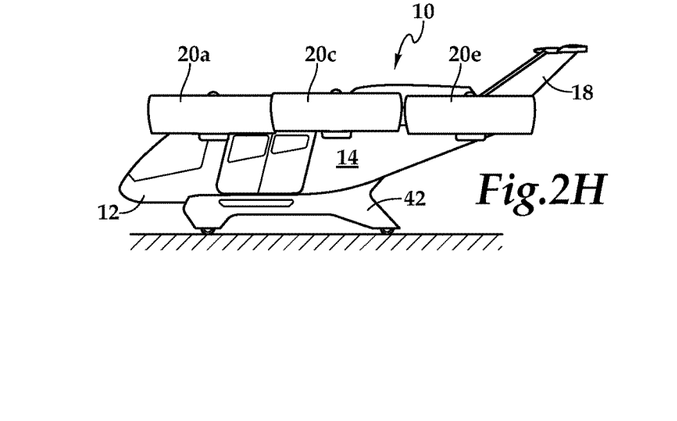

As aircraft 10 approaches its destination, aircraft 10 may begin its transition from wing-borne lift to thrust-borne lift. As best seen from the progression of FIGS. 2E-2G, the angular positions of rotor systems 20 are changed by a pitch up rotation to transition aircraft 10 from the forward flight orientation toward the VTOL orientation. As seen in FIG. 2F, rotor systems 20 have been collectively inclined about forty-five degrees pitch up. In the conversion orientations of aircraft 10, a portion of the thrust generated by rotor systems 20 begins to provide lift for aircraft 10 as the forward airspeed decreases and the lift producing capability of wings 16a, 16b decreases. As best seen in FIG. 2G, rotor systems 20 have been collectively inclined about ninety degrees pitch up such that the rotor assemblies are rotating in the horizontal plane providing thrust-borne lift for aircraft 10. Even though the conversion from the forward flight orientation to the VTOL orientation of aircraft 10 has been described as progressing with collective pitch up rotation of rotor systems 20, in other implementation, all rotor systems 20 need not be operated at the same time or at the same rate. Once aircraft 10 has completed the transition to the VTOL orientation, aircraft 10 may commence its vertical descent to a surface. As hover and landing are high power demand maneuvers, electrical system 22 preferably utilizes a combination of the power-optimized power source of the high-power batteries together with the energy-optimized power source of the high-energy batteries, the turbo-generators and/or the hydrogen fuel cells depending upon the configuration of electrical system 22 to provide the required propulsive power for rotor systems 20. As best seen in FIG. 2H, aircraft 10 has landing at the destination location.

Figure 3:
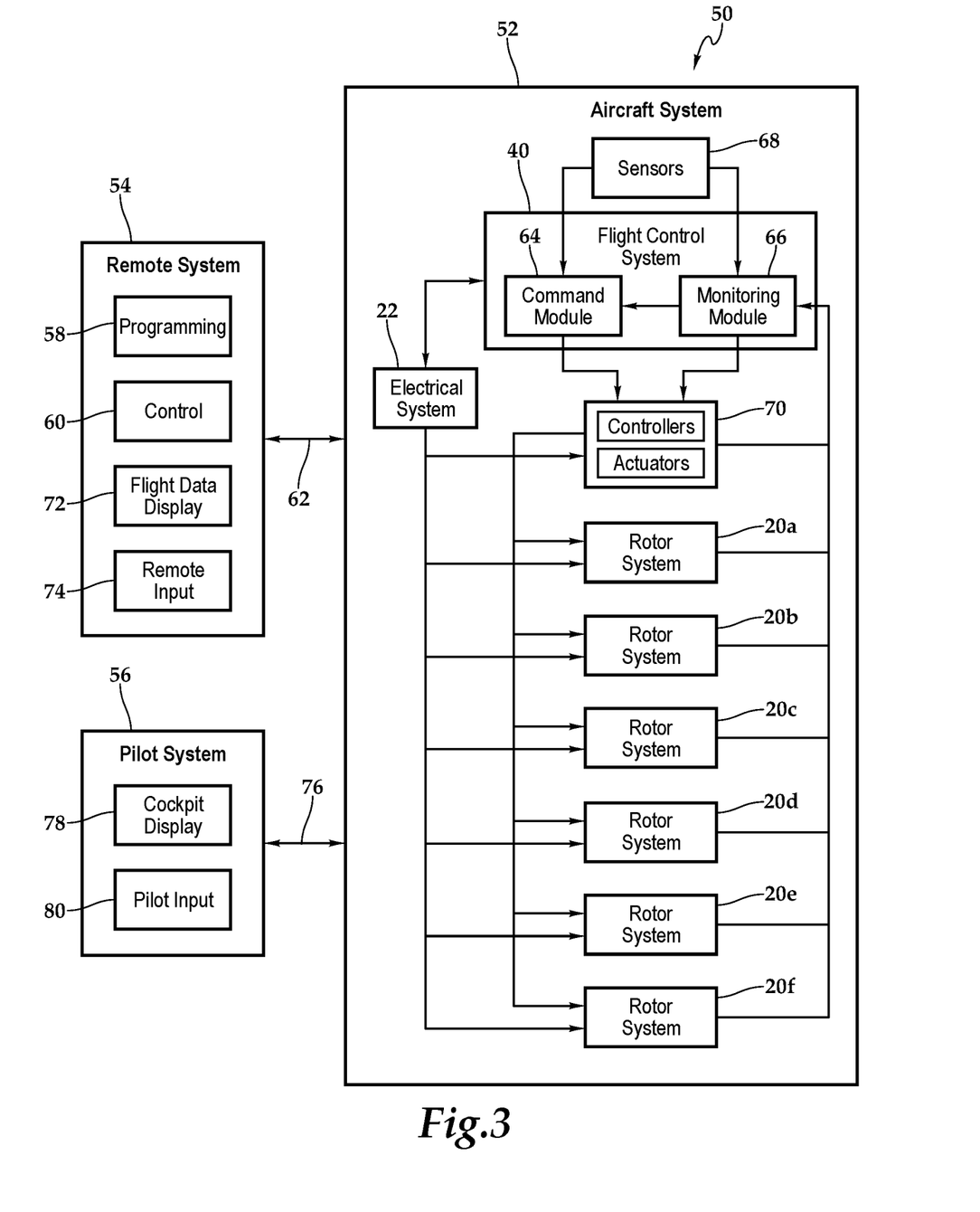
FIG. 3 is a block diagram of control systems for an eVTOL aircraft having a selectably configurable electrical architecture in accordance with embodiments of the present disclosure.

Referring additionally to FIG. 3 in the drawings, a block diagram depicts a control system 50 operable for use with aircraft 10 of the present disclosure. In the illustrated embodiment, system 50 includes three primary computer based subsystems; namely, an aircraft system 52, a remote system 54 and a pilot system 56. In some implementations, remote system 54 includes a programming application 58 and a remote control application 60. Programming application 58 enables a user to provide a flight plan and mission information to aircraft 10 such that flight control system 40 may engage in autonomous control over aircraft 10. For example, programming application 58 may communicate with flight control system 40 over a wired or wireless communication channel 62 to provide a flight plan including, for example, a starting point, a trail of waypoints and an ending point such that flight control system 40 may use waypoint navigation during the mission.

In the illustrated embodiment, flight control system 40 is a computer based system that includes a command module 64 and a monitoring module 66. It is to be understood by those skilled in the art that these and other modules executed by flight control system 40 may be implemented in a variety of forms including hardware, software, firmware, special purpose processors and combinations thereof. Flight control system 40 receives input from a variety of sources including internal sources such as electrical system 22, sensors 68, controllers and actuators 70 and rotor systems 20a-20f and external sources such as remote system 54 as well as global positioning system satellites or other location positioning systems and the like. During the various operating modes of aircraft 10 including VTOL mode, forward flight mode and transitions therebetween, command module 64 provides commands to controllers and actuators 70. These commands enable independent operation of each rotor system 20a-20f including rotor speed, collective pitch and angular position. Flight control system 40 receives feedback from controllers and actuators 70 and rotor systems 20a-20f. This feedback is processed by monitoring module 66 that can supply correction data and other information to command module 64 and/or controllers and actuators 70. Sensors 68, such as vibration sensors, location sensors, attitude sensors, speed sensors, environmental sensors, fuel sensors, temperature sensors and the like also provide information to flight control system 40 to further enhance autonomous control and power allocation capabilities.

Some or all of the autonomous control capability of flight control system 40 can be augmented or supplanted by remote flight control from, for example, remote system 54. Remote system 54 may include one or computing systems that may be implemented on general-purpose computers, special purpose computers or other machines with memory and processing capability. Remote system 54 may be a microprocessor-based system operable to execute program code in the form of machine-executable instructions. In addition, remote system 54 may be connected to other computer systems via a proprietary encrypted network, a public encrypted network, the Internet or other suitable communication network that may include both wired and wireless connections. Remote system 54 communicates with flight control system 40 via communication link 62 that may include both wired and wireless connections.

While operating remote control application 60, remote system 54 is configured to display information relating to one or more aircraft of the present disclosure on one or more flight data display devices 72. Remote system 54 may also include audio output and input devices such as a microphone, speakers and/or an audio port allowing an operator to communicate with other operators, a base station and/or a pilot onboard aircraft 10. The display device 72 may also serve as a remote input device 74 if a touch screen display implementation is used, however, other remote input devices, such as a keyboard or joystick, may alternatively be used to allow an operator to provide control commands to an aircraft being operated responsive to remote control.

Some or all of the autonomous and/or remote flight control of aircraft 10 can be augmented or supplanted by onboard pilot flight control from a pilot interface system 56 that includes one or more computing systems that communicate with flight control system 40 via one or more wired communication channels 76. Pilot system 56 preferably includes one or more cockpit display devices 78 configured to display information to the pilot. Cockpit display device 78 may be configured in any suitable form including, for example, a display panel, a dashboard display, an augmented reality display or the like. Pilot system 56 may also include audio output and input devices such as a microphone, speakers and/or an audio port allowing an onboard pilot to communicate with, for example, air traffic control. Pilot system 56 also includes a plurality of user interface devices 80 to allow an onboard pilot to provide control commands to aircraft 10 including, for example, a control panel with switches or other inputs, mechanical control devices such as steering devices or sticks as well as other control devices.

Figure 4:
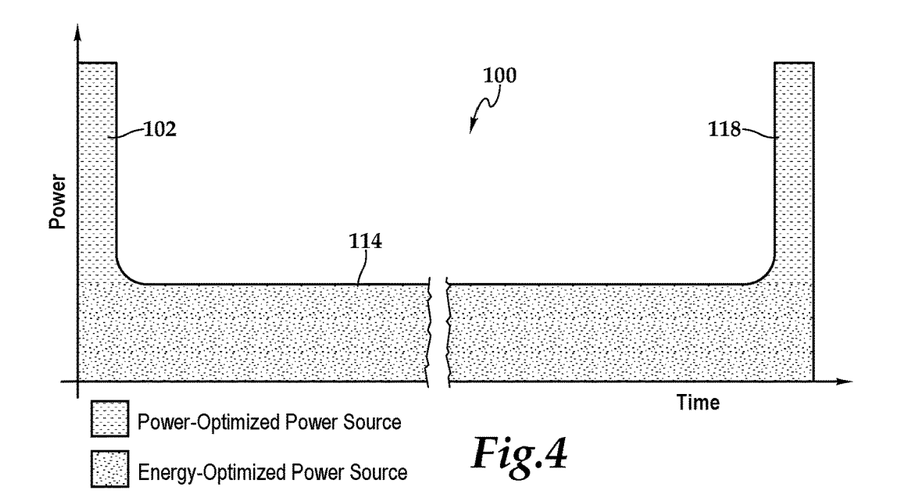
FIG. 4 is a power consumption diagram for an eVTOL aircraft having a selectably configurable electrical architecture during a typical flight in accordance with embodiments of the present disclosure.
Figure 5A:
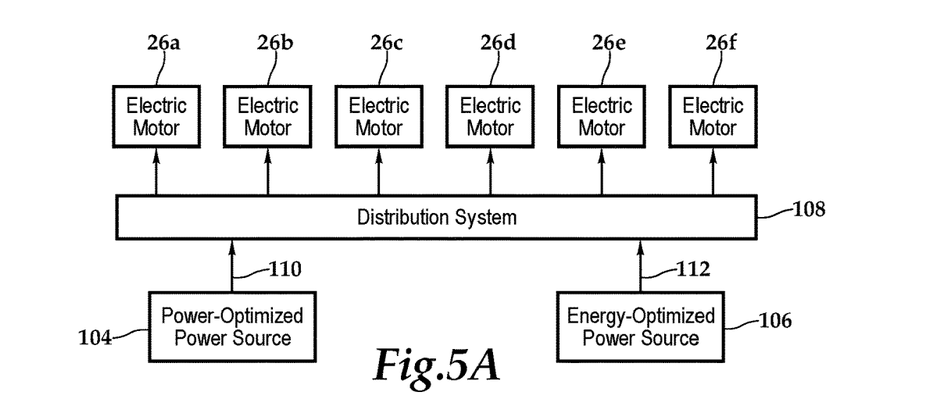
FIGS. 5A-5B are block diagrams depicting a selectably configurable electrical architecture for an eVTOL aircraft in two power demand modes in accordance with embodiments of the present disclosure.

Referring now to FIG. 4 of the drawings, a power consumption curve for a typical flight of aircraft 10 is depicted as a power versus time graph 100. As discussed herein, the initial phase of flight for an eVTOL aircraft such as aircraft 10 includes performing a vertical takeoff and climb as well as a hover in some instances. These operations are high power demand maneuvers that require significant instantaneous propulsive power. In graph 100, this initial segment of the flight with aircraft 10 in the takeoff and landing power mode is denoted as flight segment 102. As illustrated, during flight segment 102, the energy-optimized power source of aircraft 10 is providing a portion of the total power requirement with the power-optimized power source of aircraft 10 providing the remainder of the total power requirement. This power profile is represented in FIG. 5A in which a power-optimized power source 104 and an energy-optimized power source 106 are each providing electric power to a power distribution system 108, as indicated by arrows 110, 112. Power distribution system 108 delivers the electric power to the power consumers of aircraft 10 depicted as including electric motors 26a-26f of rotor systems 20, as indicated by the arrows therebetween. Power distribution system 108 may include one or more electrical buses as well as the electrical wiring between the components.

Figure 5B:
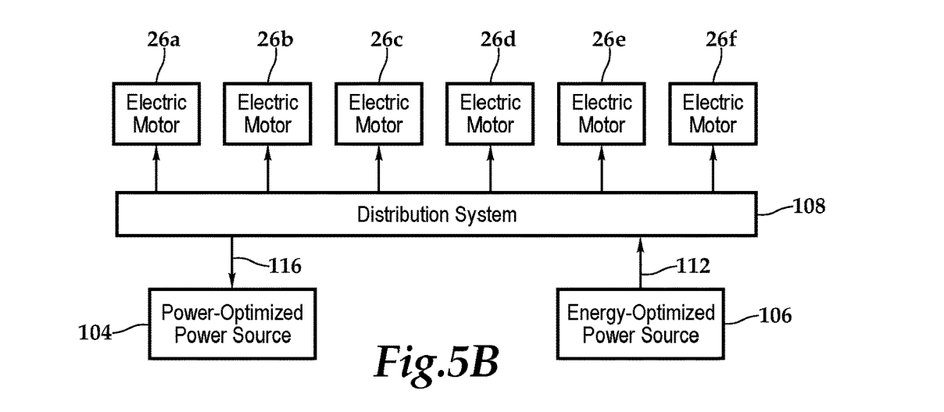

After aircraft 10 has completed the vertical takeoff and climb maneuver and has converted to the forward flight orientation for forward cruising, aircraft 10 requires significantly less propulsive power. In graph 100, this second segment of the flight with aircraft 10 in the cruise power mode is denoted as flight segment 114. As illustrated, during flight segment 114, the energy-optimized power source of aircraft 10 is providing the total power requirement (100%) for aircraft 10 with the power-optimized power source providing none (0%) of the total power requirement. This power profile is represented in FIG. 5B in which energy-optimized power source 106 is providing electric power to power distribution system 108, as indicated by arrow 112. Power distribution system 108 delivers the electric power to electric motors 26a-26f of rotor systems 20, as indicated by the arrows therebetween. In addition, power distribution system 108 delivers electric power to power-optimized power source 104, as indicated by arrow 116. In this manner, energy-optimized power source 106 recharges power-optimized power source 104 during flight segment 114 when only cruise power is required.

As aircraft 10 approaches its destination, aircraft 10 converts from the forward flight orientation back to the VTOL orientation and engages in a vertical descent and landing maneuver as well as a hover maneuver in some instances. These operations are high power demand maneuvers that require significant instantaneous propulsive power. In graph 100, this third segment of the flight with aircraft 10 in the takeoff and landing power mode is denoted as flight segment 118. As illustrated, during flight segment 118, the energy-optimized power source of aircraft 10 is providing a portion of the total power requirement with the power-optimized power source of aircraft 10 providing the remainder of the total power requirement. This power profile is represented in FIG. 5A in which power-optimized power source 104 and energy-optimized power source 106 are providing electric power to power distribution system 108, as indicated by arrows 110, 112. Power distribution system 108 delivers the electric power to electric motors 26a-26f of rotor systems 20, as indicated by the arrows therebetween.

In the illustrated example, the power provided by the power-optimized power source is greater than the power provided by the energy-optimized power source during flight segments 102, 118. In other implementations, the power provided by the power-optimized power source could be the same as or less than the power provided by the energy-optimized power source. In addition, even though the power provided by the power-optimized power source is depicted as being approximately two times greater than the power provided by the energy-optimized power source during flight segments 102, 118, it should be understood by those having ordinary skill in the art that the power ratio of the power provided by the power-optimized power source to the power provided by the energy-optimized power source could be greater than 2 to 1 such as 3 to 1, 4 to 1, 6 to 1 or more or the power ratio could be less than 2 to 1 such as 1 to 1, 0.5 to 1 or lower. Also, even though the power provided by the energy-optimized power source is depicted as being substantially constant during flight segments 102, 114, 118, it should be understood by those having ordinary skill in the art that the power provided by the energy-optimized power source in the cruise power mode could be either greater than or less than the power provided by the energy-optimized power source in the takeoff and landing power mode.

In this illustrated embodiment, the energy-optimized power source has been sized and designed to provide the required power for all the electrical requirements of aircraft 10 in the cruise power mode based upon the efficiencies of the components and other factors that are well known to those having ordinary skill in the art. The power-optimized power source has been sized and designed to provide the required boost in power for the instantaneous peak power requirements in the takeoff and landing power mode based upon the efficiencies of the components and other factors that are well known to those having ordinary skill in the art. In other embodiments, the power-optimized power source could be sized and designed to meet the total instantaneous peak power requirements for the takeoff and landing power mode. The specific power sharing regime of the power-optimized power source and the energy-optimized power source for a particular implementation and/or a particular maneuver will be determined, for example, by a power management module in flight control computer 40 with the power sharing regime ranging between the power-optimized power source exclusively providing power, the energy-optimized power source exclusively providing power or any jointly powered scenario therebetween.

Figure 6:
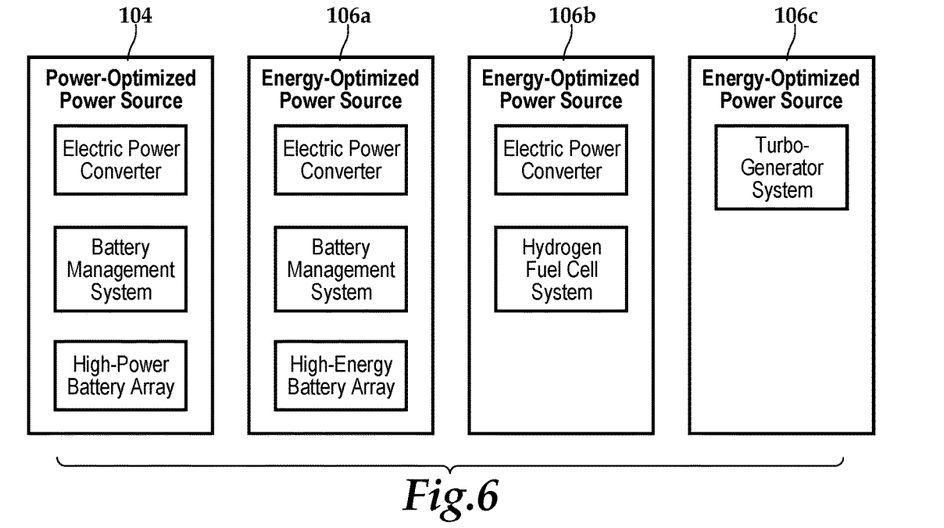
FIG. 6 is a block diagram depicting a power-optimized power source and three selectably configurable energy-optimized power sources for an eVTOL aircraft in accordance with embodiments of the present disclosure.

Referring additionally to FIG. 6 in the drawings, a block diagram depicts a power-optimized power source and three selectably configurable energy-optimized power sources for an eVTOL aircraft such as aircraft 10. As discussed herein, having both a power-optimized power source and an energy-optimized power source on aircraft 10 enables improved power management over both transient high power demand requirements and sustained low power demand requirements. In addition, aircraft 10 is designed such that the particular energy-optimized power source can be selected from a plurality of energy-optimized power sources depending upon the service of aircraft 10 and/or the mission being performed by aircraft 10.

For example, if aircraft 10 is intended to provide local air taxi services operating within a predictable flight endurance range and payload range, the electrical architecture of aircraft 10 may be configured with power-optimized power source 104 that includes a high-power battery array and energy-optimized power source 106a that includes a high-energy battery array. In the illustrated embodiment, in addition to the high-power battery array, power-optimized power source 104 includes a battery management system and an electric power converter. The battery management system protects the high-power batteries from over-charging and over-discharging, calculates the state of charge of the high-power batteries and monitors the health and safety of the high-power batteries. The electric power converter may be a DC-to-DC converter used to convert the battery voltage of the high-power batteries to the desired distribution voltage of distribution system 108 and operating voltage of electric motors 26. For example, the battery voltage of the high-power batteries may be between 550 volts and 800 volts while the desired distribution and operating voltages may be between 800 volts and 1500 volts, depending upon the specific implementation. In this case, the electric power converter boosts the battery voltage of the high-power batteries to the desired distribution and operating voltages. In addition, the battery voltage of particular high-power batteries within the high-power battery array may have allowable variations which the electric power converter conditions. Further, the electric power converter may enable electric power having a lower voltage than the battery voltage of the high-power batteries to charge the high-power batteries.

In the illustrated embodiment, in addition to the high-energy battery array, energy-optimized power source 106a includes a battery management system and an electric power converter that may operate in substantially the same manner as the battery management system and the electric power converter discussed with reference to power-optimized power source 104. For example, the battery voltage of the high-energy batteries may be between 550 volts and 800 volts while the desired distribution and operating voltages may be between 800 volts and 1500 volts, depending upon the specific implementation, thus requiring the electric power converter to boosts the battery voltage of the high-energy battery array to the desired distribution and operating voltages.

As another example, if aircraft 10 is intended to provide regional air taxi services requiring greater flight endurance ranges and/or larger payloads, the electrical architecture of aircraft 10 may be configured with power-optimized power source 104 that includes a high-power battery array and energy-optimized power source 106b that includes a hydrogen fuel cell system. In the illustrated embodiment, in addition to the hydrogen fuel cell system, energy-optimized power source 106b includes an electric power converter that boosts the output voltage of the hydrogen fuel cell system to the desired distribution and operating voltages. For example, the hydrogen fuel cell system may generate electric power between 500 volts and 600 volts with the desired distribution and operating voltages being between 800 volts and 1500 volts. As the energy density of hydrogen is greater than that of the high-energy batteries of energy-optimized power source 106a, the hydrogen fuel cell system of energy-optimized power source 106b provides a greater flight endurance range and/or a greater payload capacity.

As a further example, if aircraft 10 is intended to provide transportation services requiring greater flight endurance ranges and/or larger payloads in an area where hydrogen fuel is not generally available, such as a military theater, the electrical architecture of aircraft 10 may be configured with power-optimized power source 104 that includes a high-power battery array and energy-optimized power source 106c that includes a turbo-generator system. As the energy density of liquid hydrocarbon fuel is greater than that of the high-energy batteries of energy-optimized power source 106a, the turbo-generator system of energy-optimized power source 106c provides a greater flight endurance range and/or a greater payload capacity, while also using a commodity fuel.

Importantly, the electrical architecture of aircraft 10 is selectively configurable with any one of energy-optimized power sources 106a, 106b, 106c, depending upon the intended service of aircraft 10. In addition, energy-optimized power sources 106a, 106b, 106c may be interchangeably combined with power-optimized power source 104 in electrical system 22 of aircraft 10 depending upon the desired mission to be performed. For example, an aircraft 10 that typically provides or previously provided local air taxi services utilizing power-optimized power source 104 in combination with energy-optimized power source 106a may be retrofitted or hot swapped to utilize power-optimized power source 104 in combination with energy-optimized power source 106b or energy-optimized power source 106c. Similarly, an aircraft 10 configured with power-optimized power source 104 in combination with energy-optimized power source 106b may be retrofitted or hot swapped to be configured with power-optimized power source 104 in combination with energy-optimized power source 106a or energy-optimized power source 106c. Likewise, an aircraft 10 configured with power-optimized power source 104 in combination with energy-optimized power source 106c may be retrofitted or hot swapped to be configured with power-optimized power source 104 in combination with energy-optimized power source 106a or energy-optimized power source 106b.

In some implementations, the electrical architecture of aircraft 10 is selectively configurable with more than one of energy-optimized power sources 106a, 106b, 106c. For example, an aircraft 10 of the present disclosure may be configured with power-optimized power source 104 in combination with an energy-optimized power source 106 that includes a high-energy battery array of energy-optimized power source 106a and a hydrogen fuel cell system of energy-optimized power source 106b. Similarly, an aircraft 10 of the present disclosure may be configured with power-optimized power source 104 in combination with an energy-optimized power source 106 that includes a high-energy battery array of energy-optimized power source 106a and a turbo-generator system of energy-optimized power source 106c. Likewise, an aircraft 10 of the present disclosure may be configured with power-optimized power source 104 in combination with an energy-optimized power source 106 that includes a hydrogen fuel cell system of energy-optimized power source 106b and a turbo-generator system of energy-optimized power source 106c. In addition, an aircraft 10 of the present disclosure may be configured with power-optimized power source 104 in combination with an energy-optimized power source 106 that includes a high-energy battery array of energy-optimized power source 106a, a hydrogen fuel cell system of energy-optimized power source 106b and a turbo-generator system of energy-optimized power source 106c.

Figure 7A:
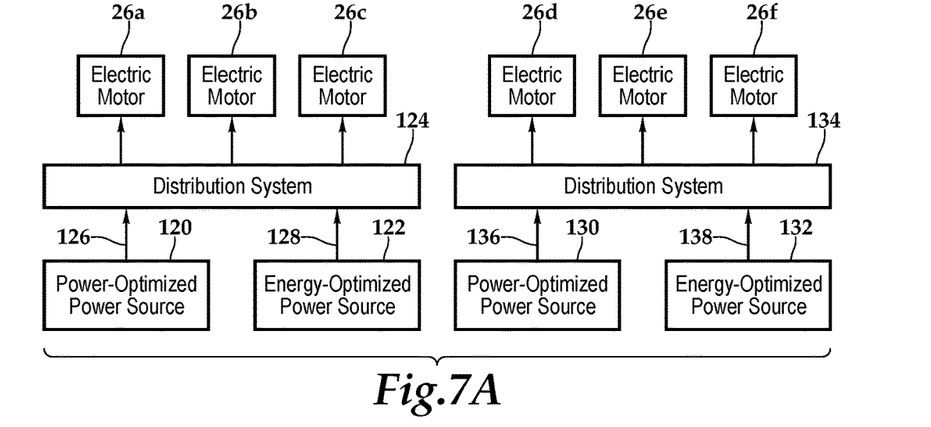
FIGS. 7A-7B are block diagrams depicting a redundant electrical system having a selectably configurable electrical architecture for an eVTOL aircraft in two power demand modes in accordance with embodiments of the present disclosure.

Referring now to FIGS. 7A-7B of the drawings, a redundant electrical system is depicted as two independent electrical systems for an eVTOL aircraft such as aircraft 10. In FIG. 7A, aircraft 10 is in the takeoff and landing power mode with a power-optimized power source 120 and an energy-optimized power source 122 each providing electric power to a power distribution system 124, as indicated by arrows 126, 128. Power distribution system 124 delivers the electric power to certain of the power consumers of aircraft 10 depicted as including electric motors 26a-26c, as indicated by the arrows therebetween. In addition, a power-optimized power source 130 and an energy-optimized power source 132 are providing electric power to a power distribution system 134, as indicated by arrows 136, 138. Power distribution system 134 delivers the electric power to certain of the power consumers of aircraft 10 depicted as including electric motors 26d-26f, as indicated by the arrows therebetween.

Figure 7B:
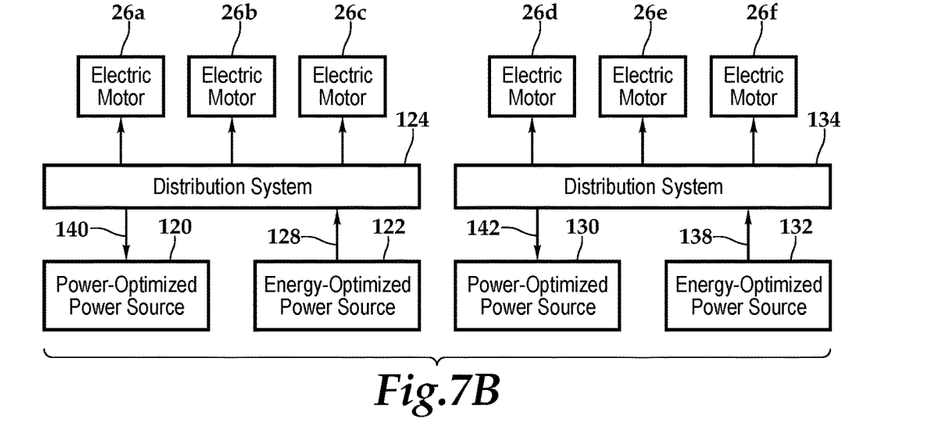

In FIG. 7B, aircraft 10 is in the cruise power mode with energy-optimized power source 122 providing electric power to power distribution system 124, as indicated by arrow 128. Power distribution system 124 delivers the electric power to certain of the power consumers of aircraft 10 depicted as including electric motors 26a-26c, as indicated by the arrows therebetween. Power distribution system 124 also delivers electric power to power-optimized power source 120, as indicated by arrow 140, to recharge the high-power batteries thereof. In addition, energy-optimized power source 132 is providing electric power to power distribution system 134, as indicated by arrow 138. Power distribution system 134 delivers the electric power to certain of the power consumers of aircraft 10 depicted as including electric motors 26d-26f, as indicated by the arrows therebetween. Power distribution system 134 also delivers electric power to power-optimized power source 130, as indicated by arrow 142, to recharge the high-power batteries thereof. In this manner, the electrical system of aircraft 10 may be configured as a redundant electrical system providing an added safety margin in the event of a fault in the electrical system.

Even though a redundant electrical system has been depicted and described with reference to FIGS. 7A-7B as having two independent electrical systems, it should be understood by those having ordinary skill in the art that a redundant electrical system of the present disclosure could incorporate any number of independent electrical systems. In addition, it should be noted that the energy-optimized power sources in a redundant electrical system need not be of the same type. For example, energy-optimized power source 122 may be a high-energy battery array while energy-optimized power source 132 may be a hydrogen fuel cell system. Alternatively, energy-optimized power source 122 may be a high-energy battery array while energy-optimized power source 132 may be a turbo-generator system. As another alternative, energy-optimized power source 122 may be a hydrogen fuel cell system while energy-optimized power source 132 may be a turbo-generator system.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A configurable electrical architecture for an eVTOL aircraft having a takeoff and landing power mode and a cruise power mode, the configurable electrical architecture comprising:
    a power-optimized power source including a high-power battery array and an electric power converter;
    an energy-optimized power source selected from a plurality of interchangeable energy-optimized power sources and including an electric power converter;
    a distribution system electrically coupled to the power-optimized power source and the energy-optimized power source; and
    at least one electric motor electrically coupled to the distribution system;
    wherein, in the takeoff and landing power mode, both the power-optimized power source and the energy-optimized power source provide electrical power to the at least one electric motor;
    wherein, in the cruise power mode, the energy-optimized power source provides electrical power to the at least one electric motor and to the power-optimized power source to recharge the high-power battery array;
    wherein, the energy-optimized power source provides a substantially constant power level in both the takeoff and landing power mode and the cruise power mode, the power-optimized power source contributing all power above the substantially constant power level in the takeoff and landing power mode;
    wherein, a distribution voltage of the distribution system and an operating voltage of the at least one electric motor are higher than an output voltage of the high-power battery array and higher than an output voltage of the energy-optimized power source;
    wherein, the electric power converter of the power-optimized power source upconverts the output voltage of the high-power battery array to the operating voltage; and
    wherein, the electric power converter of the energy-optimized power source upconverts the output voltage of the energy-optimized power source to the operating voltage.

2. The configurable electrical architecture as recited in claim 1 wherein the power-optimized power source further comprises a battery management system operably associated with the high-power battery array.

3. The configurable electrical architecture as recited in claim 1 wherein the energy-optimized power source further comprises a high-energy battery array.

4. The configurable electrical architecture as recited in claim 3 wherein the energy-optimized power source further comprises a battery management system operably associated with the high-energy battery array.

5. The configurable electrical architecture as recited in claim 3 wherein the distribution voltage of the distribution system and the operating voltage of the at least one electric motor are higher than an output voltage of the high-energy battery array.

6. The configurable electrical architecture as recited in claim 1 wherein the energy-optimized power source further comprises a hydrogen fuel cell system.

7. The configurable electrical architecture as recited in claim 6 wherein the distribution voltage of the distribution system and the operating voltage of the at least one electric motor are higher than an output voltage of the hydrogen fuel cell system.

8. The configurable electrical architecture as recited in claim 1 wherein the energy-optimized power source further comprises a turbo-generator system.

9. The configurable electrical architecture as recited in claim 1 wherein the plurality of interchangeable energy-optimized power sources further comprises a high-energy battery array, a hydrogen fuel cell system and a turbo-generator system.

10. The configurable electrical architecture as recited in claim 1 wherein the energy-optimized power source further comprises a high-energy battery array and a hydrogen fuel cell system.

11. The configurable electrical architecture as recited in claim 1 wherein the energy-optimized power source further comprises a high-energy battery array and a turbo-generator system.

12. The configurable electrical architecture as recited in claim 1 wherein the energy-optimized power source further comprises a hydrogen fuel cell system and a turbo-generator system.

13. The configurable electrical architecture as recited in claim 1 wherein the distribution system further comprises an electrical bus.

14. The configurable electrical architecture as recited in claim 1 wherein the at least one electric motor further comprises a plurality of electric motors.

15. The configurable electrical architecture as recited in claim 1 wherein, in the takeoff and landing power mode, a power ratio of the power-optimized power source to the energy-optimized power source is at least 2 to 1.

16. An eVTOL aircraft having a takeoff and landing power mode and a cruise power mode, the eVTOL aircraft comprising:
    at least one rotor system having an electric motor; and
    an electrical system configured to provide electric power to the electric motor, the electrical system having a configurable electrical architecture including:
        a power-optimized power source including a high-power battery array and an electric power converter;
        an energy-optimized power source selected from a plurality of interchangeable energy-optimized power sources and including an electric power converter; and
        a distribution system electrically coupled to the power-optimized power source, the energy-optimized power source and electric motor;
    wherein, in the takeoff and landing power mode, both the power-optimized power source and the energy-optimized power source provide electrical power to the electric motor;
    wherein, in the cruise power mode, the energy-optimized power source provides electrical power to the electric motor and to the power-optimized power source to recharge the high-power battery array;
    wherein, the energy-optimized power source provides a substantially constant power level in both the takeoff and landing power mode and the cruise power mode, the power-optimized power source contributing all power above the substantially constant power level in the takeoff and landing power mode;
    wherein, a distribution voltage of the distribution system and an operating voltage of the at least one electric motor are higher than an output voltage of the high-power battery array and higher than an output voltage of the energy-optimized power source;
    wherein, the electric power converter of the power-optimized power source upconverts the output voltage of the high-power battery array to the operating voltage; and
    wherein, the electric power converter of the energy-optimized power source upconverts the output voltage of the energy-optimized power source to the operating voltage.

17. The eVTOL aircraft as recited in claim 16 wherein the eVTOL aircraft is an air taxi configured for autonomous flight.

* * * * *